(12) United States Patent
Nishiwaki et al.

(10) Patent No.: US 7,126,904 B2
(45) Date of Patent: Oct. 24, 2006

(54) OPTICAL DISK DEVICE

(75) Inventors: Seiji Nishiwaki, Kobe (JP); Kazuo Momoo, Hirakata (JP); Yuichi Takahashi, Nara (JP); Kei Ikeda, Matsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 630 days.

(21) Appl. No.: 10/255,496

(22) Filed: Sep. 26, 2002

(65) Prior Publication Data

US 2003/0072246 A1 Apr. 17, 2003

(30) Foreign Application Priority Data

Sep. 27, 2001 (JP) .............................. 2001-296823

(51) Int. Cl.
*G11B 7/135* (2006.01)
(52) U.S. Cl. .................................. 369/112.26; 369/121
(58) Field of Classification Search ............ 369/112.26
See application file for complete search history.

(56) References Cited

U.S. PATENT DOCUMENTS 6,201,780 B1 * 3/2001 Katayama .............. 369/112.19
6,717,906 B1 * 4/2004 Shimano ................ 369/112.26
2001/0000310 A1 * 4/2001 Yoo et al. .............. 369/112.26
2002/0181366 A1 * 12/2002 Katayama .................. 369/53.2

FOREIGN PATENT DOCUMENTS

EP    0 881 634    12/1998
JP    10-334504    12/1998

* cited by examiner

*Primary Examiner*—Andrea Wellington
*Assistant Examiner*—Lixi Chow
(74) *Attorney, Agent, or Firm*—RatnerPrestia

(57) ABSTRACT

A first light ray with a wavelength $\lambda 1$ emanating from the first emission light source passes through the transparent substrate and is condensed by the objective lens on a signal surface of a first optical disk with a substrate thickness t1, a second light ray with a wavelength $\lambda 2$ ($\neq \lambda 1$) emanating from the second emission light source passes through the transparent substrate and is condensed by the objective lens on a signal surface of a second optical disk with a substrate thickness t2, a step structure of at least one step is formed along a circle or an ellipse on a surface of the transparent substrate, and and by the step of the step structure, a phase of the first light ray is shifted by $2\pi n1 + \Delta 1$ and a phase of the second light ray is shifted by $2\pi n2 + \Delta 2$.

11 Claims, 12 Drawing Sheets

Fig. 11 (a) PRIOR ART
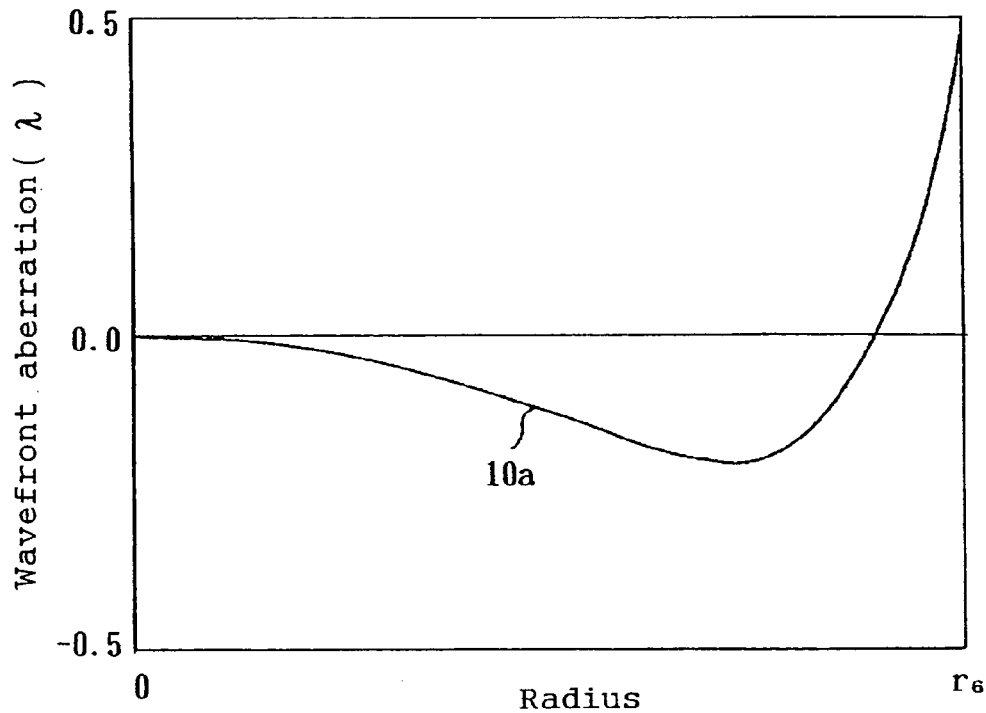
Fig. 11 (b) PRIOR ART
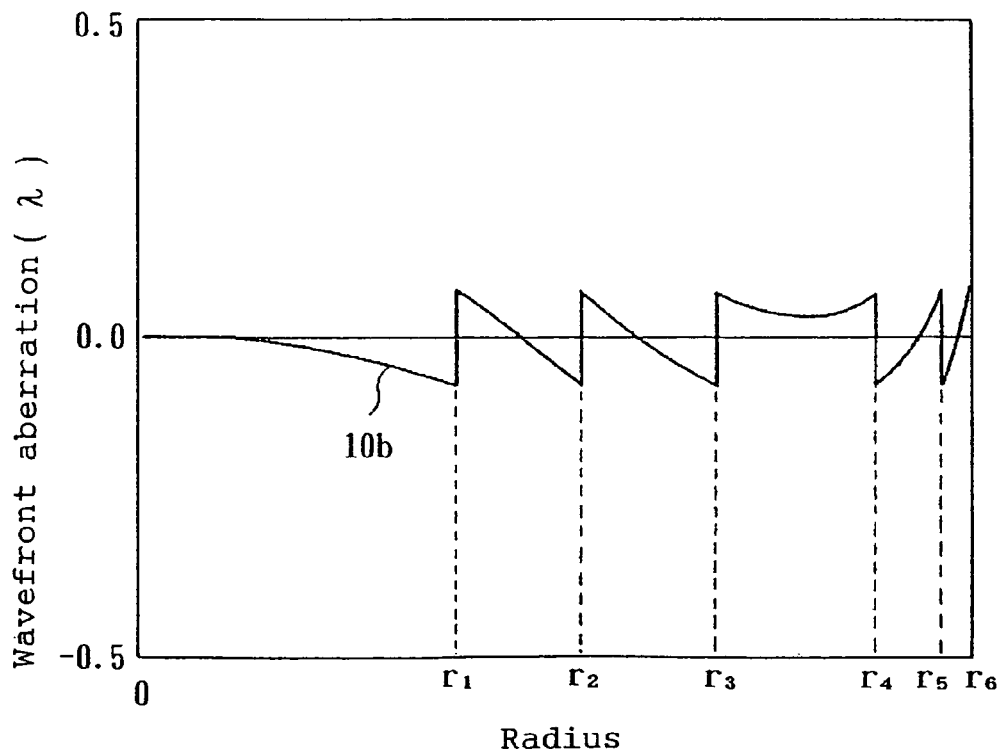

OPTICAL DISK DEVICE

BACKGROUND OF THE INVENTION

1. Field of the Invention

The present invention relates to an optical disk device used for recording signals onto optical disks or reproducing signals recorded on optical disks.

2. Description of the Prior Art

Prior art will be described with Japanese Laid-Open Patent Application No. H10-334504 as an example. FIG. 12 shows the cross-sectional structure of an optical disk device according to the conventional example. In FIG. 12, a light ray from an optical system 8 with red laser light (wavelength $\lambda'$=approximately 660 nm) as the light source passes through a beam splitter 2, is reflected at a reflecting mirror 3, passes through a transparent substrate 21 and an objective lens 23 fixed to a lens holder 22, is condensed by the objective lens 23, and converges on a signal surface 7a of an optical disk substrate 7 with a thickness of approximately 0.6 mm. The objective lens 23 is optimized for the optical disk substrate 7 with a thickness of 0.6 mm, and substantially no aberration is caused in the condensation onto the signal surface 7a.

On the other hand, a light ray from an optical system 1 with infrared laser light (wavelength $\lambda$=approximately 790 nm) as the light source is reflected at the beam splitter 2, is reflected at the reflecting mirror 3, passes through the transparent substrate 21 and the objective lens 23 fixed to the lens holder 22, is condensed by the objective lens 23, and converges on a signal surface 9a of an optical disk substrate 9 with a thickness of approximately 1.2 mm. Since the objective lens 23 is optimized for the optical disk substrate 7 with a thickness of 0.6 mm, aberration is caused in the converged light in the case of the optical disk substrate 9 with a thickness of 1.2 mm. However, this aberration is corrected by the transparent substrate 21.

FIG. 10 shows the cross-sectional structure of the transparent substrate 21. On the transparent substrate 21, phase difference films 21a and 21b are formed in an area inside a radius r6, and by these films, a step with a depth d is formed in each of the positions of radii r1, r2, r3, r4 and r5. In the zonal area outside the radius r6, an interference filter film 21c is formed. The interference filter film 21c is designed so as to allow red laser light to pass therethrough but not to allow infrared laser light to pass therethrough. Therefore, for infrared laser light, the aperture can be limited to the inside of the radius r6. For example, when the NA of the objective lens is 0.60 and the radius r6 is 0.5×f (f is the focal length of the objective lens), because of the presence of the interference filter film 21c, red laser light and infrared laser light can be condensed on the signal surface of the optical disk under conditions where NA=0.60 and NA=0.50, respectively.

FIGS. 11(a) and 11(b) show the wavefront aberration characteristics of the infrared laser light when it passes through the optical disk substrate 9 with a thickness of 1.2 mm. The curve 10a of FIG. 11(a) and the curve 10b of FIG. 11(b) plot the wavefront aberrations in the radius positions when the transparent substrate 21 is absent and when the transparent substrate 21 is present, respectively. As shown by the curve 10a of FIG. 11(a), since the objective lens 23 is optimized for the optical disk substrate 7 with a thickness of 0.6 mm, large spherical aberration is caused in the case of the optical disk substrate 9 with a thickness of 1.2 mm. When the wavelength of the red laser light is $\lambda'$ and the refractive index of the phase difference films 21a and 21b to the red light source is n, the depth d is given by the following expression:

$$d=\lambda'/(n-1) \quad \text{(Expression 1)}$$

Therefore, the phase difference caused by the red laser light passing through the step with the depth d corresponds to $\lambda'$ ($2\pi$ when expressed as an angle), which means that substantially no phase difference is present. Therefore, the red laser light passes through the phase difference films 21a and 21b as it is with substantially no phase change.

On the other hand, since the refractive index to the infrared light approximates n, the phase difference caused by the infrared laser light passing through the step with the depth d is also substantially $\lambda'$. However, since $\lambda'$ is, approximately, $\lambda-\lambda/6$ when $\lambda'$ is 660 nm and $\lambda$ is 790 nm, a phase difference $\delta$ of $-\lambda/6$ ($-\pi/3$ when expressed as an angle) is caused. Therefore, as shown by the curve 10b, from the phase in the area between the radii 0 and r1, the phase is advanced relatively by $\lambda/6$ ($\pi/3$ when expressed as an angle) in the zonal areas between the radii r1 and r2 and between the radii r5 and r6, the phase is advanced relatively by $2\lambda/6$ ($2\pi/3$ when expressed as an angle) in the zonal areas between the radii r2 and r3 and between the radii r4 and r5, and the phase is advanced relatively by $3\lambda/6$ ($3\pi/3$ when expressed as an angle) in the zonal area between the radii r3 and r4. The curve 10b is lower in the RMS value of the wavefront aberration in the area between the radii 0 and r6 than the curve 10a, and the wavefront aberration is small because of the presence of the phase difference films 21a and 21b.

For example, under a condition where r1/f=0.09, r2/f=0.17, r3/f=0.25, r4/f=0.40, r5/f=0.43 and r6/f=0.45, aberration of 188 m$\lambda$ (mostly third-order spherical aberration) can be reduced to 42 m$\lambda$. The remaining aberration is mostly higher-order aberration, and third- and lower-order aberration is substantially zero. Since higher-order aberration does not affect the spot size although decreasing the light quantity of the main spot at the light condensation point, the recording and reproduction performance of the optical disk device is hardly affected. Therefore, by the presence of the phase difference films 21a and 21b, excellent signal recording and reproduction are realized for optical disks with different substrate thicknesses.

This conventional optical disk device has the following problems: In the conventional example, since aberration concentrates only on the side of the infrared laser light, the aberration amount increases, and the number of phase steps of the transparent substrate 21 for correcting the increase in aberration increases. Generally, the number of phase steps and the step amount per step are proportional to the generated higher-order aberration. The higher-order aberration, although not affecting the recording and reproduction performance, equivalently means reduction in light use efficiency, and higher-order aberration of 42 m$\lambda$ corresponds to a loss of approximately 7%. Moreover, the transparent substrate 21 and the objective lens 23 are aligned by being fitted in the lens holder 5, and accumulation of the cutting precision error of the perimeter with respect to the center of the phase difference films 21a and 21b of the transparent substrate 21, the decentering error of the central axis with respect to the rim of the objective lens 23 and the clearance errors of the transparent substrate 21 and the objective lens 23 with respect to the lens holder 22 generally causes a decentering of approximately 50 μm at the center of the phase difference films 21a and 21b and the center of the objective lens 23.

In the case of the red laser light involving no phase change, the decentering of the phase difference films 21a and 21g causes no problem. However, in the case of the infrared laser light, the decentering of the phase difference films 21a and 21b causes aberrations. As an example, under the above-mentioned condition (r1/f=0.09, r2/f=0.17, r3/f=0.25, r4/f=0.40, r5/f=0.43 and r6/f=0.45), the decentering of 50 µm causes third-order coma aberration of approximately 50 mλ. Third-order coma aberration largely affects the shape of the main spot at the light condensation point and the side lobe, and causes problems such as deterioration in reproduction performance (e.g. deterioration in jitter and C/N), deterioration in recording performance (e.g. recording cannot be performed at a predetermined power and some of the signals on adjoining tracks are overwritten) and deterioration in erasure performance (e.g. some of the signals on adjoining tracks are erased).

SUMMARY OF THE INVENTION

The present invention is made in view of the above-mentioned problems, and an object thereof is to provide an optical disk device capable of realizing excellent signal recording and reproduction for optical disks with different substrate thicknesses by significantly reducing the aberration and the higher-order aberration caused by the decentering of the transparent substrate 21 and the objective lens 23.

One aspect of the present invention is an optical disk device comprising:

a first emission light source;
a second emission light source;
a transparent substrate; and
an objective lens, wherein a first light ray with a wavelength $\lambda 1$ emanating from the first emission light source passes through the transparent substrate and is condensed by the objective lens on a signal surface of a first optical disk with a substrate thickness t1, wherein a second light ray with a wavelength $\lambda 2$ ($\neq \lambda 1$) emanating from the second emission light source passes through the transparent substrate and is condensed by the objective lens on a signal surface of a second optical disk with a substrate thickness t2, wherein a step structure of at least one step is formed along a circle or an ellipse on a surface of the transparent substrate, and wherein by the step of the step structure, a phase of the first light ray is shifted by $2\pi n1+\Delta 1$ (n1 is an integer, and $\Delta 1$ is not 0 but a value between $-\pi$ and $\pi$) and a phase of the second light ray is shifted by $2\pi n2+\Delta 2$ (n2 is an integer, and $\Delta 2$ is not 0 but a value between $-\pi$ and $\pi$).

Another aspect of the present invention is an optical disk device, wherein a light ray incident with a substantially parallel wavefront on at least an area of the objective lens is condensed with substantially no aberration on a signal surface of a third optical disk with a substrate thickness t3 (a value different from t1 and t2).

Still another aspect of the present invention is an optical disk device, wherein a light ray incident with a substantially parallel wavefront on an area of a radius $r \leq a$ of the objective lens is condensed with substantially no aberration on the signal surface of the third optical disk, and wherein a light ray incident with a substantially parallel wavefront on an area of a radius $r > a$ of the objective lens is condensed with substantially no aberration on the signal surface of the first optical disk.

Yet still another aspect of the present invention is an optical disk device;

wherein the substrate thickness t3 is a value between t1 and t2, and a relationship $\Delta 1 \times \Delta 2 < 0$ holds between the phase differences $\Delta 1$ and $\Delta 2$.

Still yet another aspect of the present invention is an optical disk device, wherein a relationship $\Delta 1 = -\Delta 2$ approximately holds between the phase differences $\Delta 1$ and $\Delta 2$.

A further aspect of the present invention is an optical disk device, wherein the following approximately hold: the wavelength $\lambda 1=0.66$ µm; the substrate thickness t1=0.6 mm; the wavelength $\lambda 2=0.79$ µm; and the substrate thickness t2=1.2 mm.

A still further aspect of the present invention is an optical disk device, wherein the following approximately hold: the wavelength $\lambda 1=0.66$ µm; the substrate thickness t1=0.6 mm; the wavelength $\lambda 2=0.79$ µm; the substrate thickness t2=1.2 mm; and the substrate thickness t3=0.85 mm.

A yet further aspect of the present invention is an optical disk device comprising:

a first emission light source;
a second emission light source; and
an objective lens, wherein a first light ray with a wavelength $\lambda 1$ emanating from the first emission light source is condensed by the objective lens on a signal surface of a first optical disk with a substrate thickness t1, wherein a second light ray with a wavelength $\lambda 2$ ($\neq \lambda 1$) emanating from the second emission light source is condensed by the objective lens on a signal surface of a second optical disk with a substrate thickness t2, wherein a step structure of at least one step is formed along a circle on a surface of the objective lens, and wherein by the step of the step structure, a phase of the first light ray is shifted by $2\pi n1+\Delta 1$ (n1 is an integer, and $\Delta 1$ is not 0 but a value between $-\pi$ and $\pi$) and a phase of the second light ray is shifted by $2\pi n2+\Delta 2$ (n2 is an integer, and $\Delta 2$ is not 0 but a value between $-\pi$ and $\pi$).

A still yet further aspect of the present invention is an optical disk device, wherein when it is assumed that the step structure formed on the objective lens is absent, a light ray incident with a substantially parallel wavefront on at least an area of the objective lens is condensed with substantially no aberration on a signal surface of a third optical disk with a substrate thickness t3 (a value different from t1 and t2).

An additional aspect of the present invention is an optical disk device, wherein when it is assumed that the step structure formed on the objective lens is absent, a light ray incident with a substantially parallel wavefront on an area of a radius $r \leq a$ of the objective lens is condensed with substantially no aberration on the signal surface of the third optical disk, and a light ray incident with a substantially parallel wavefront on an area of the radius $r > a$ of the objective lens is condensed with substantially no aberration on the signal surface of the first optical disk.

A still additional aspect of the present invention is an optical disk device, wherein the substrate thickness t3 is a value between t1 and t2, and a relationship $\Delta 1 \times \Delta 2 < 0$ holds between the phase differences $\Delta 1$ and $\Delta 2$.

A yet additional aspect of the present invention is an optical disk device, wherein a relationship $\Delta 1 = -\Delta 2$ approximately holds between the phase differences $\Delta 1$ and $\Delta 2$.

A still yet additional aspect of the present invention is an optical disk device according to any of the 8th to 12th inventions, wherein the following approximately hold: the wavelength $\lambda 1 = 0.66$ μm; the substrate thickness $t1 = 0.6$ mm; the wavelength $\lambda 2 = 0.79$ μm; and the substrate thickness $t2 = 1.2$ mm.

A supplementary aspect of the present invention is an optical disk device, wherein the following approximately hold: the wavelength $\lambda 1 = 0.66$ μm; the substrate thickness $t1 = 0.6$ mm; the wavelength $\lambda 2 = 0.79$ μm; the substrate thickness $t2 = 1.2$ mm; and the substrate thickness $t3 = 0.85$ mm.

According to the above-described structure, since the distortion of the wavefront concentrating on one light ray can be distributed to two light rays, the generation of higher-order aberration due to the phase correction and the generation of aberration due to the decentering of the transparent substrate and the objective lens can be reduced.

BRIEF DESCRIPTION OF THE DRAWINGS

FIG. 11(a) shows the wavefront aberration characteristic of the infrared laser light when it passes through the optical disk substrate 9 with a thickness of 1.2 mm in the conventional example (when the transparent substrate 21 is absent);

FIG. 11(b) shows the wavefront aberration characteristic of the infrared laser light when it passes through the optical disk substrate 9 with a thickness of 1.2 mm in the conventional example (when the transparent substrate 21 is present)

Explanation of Reference Numerals

Figure 1:
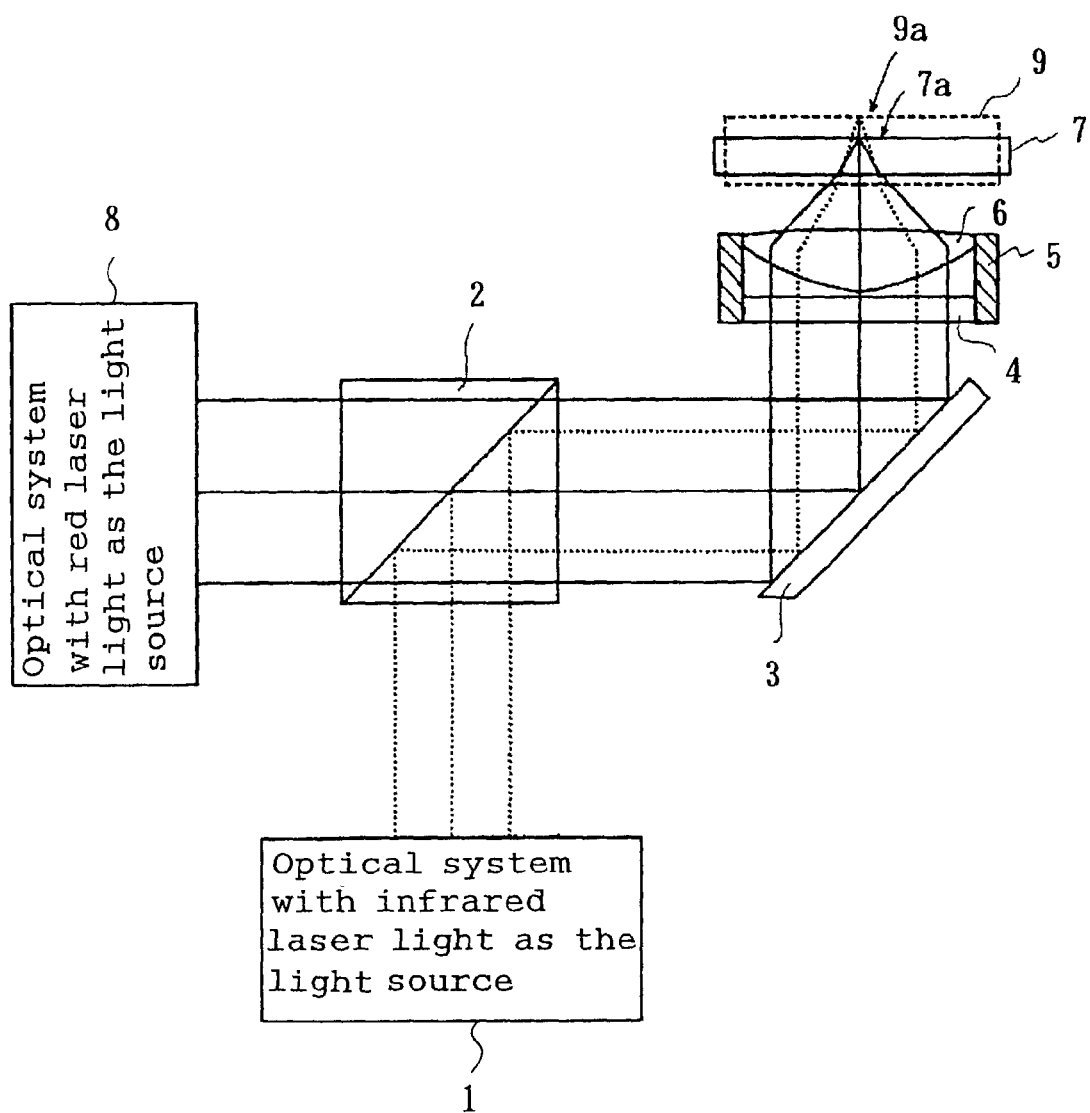
FIG. 1 shows the cross-sectional structure of optical disk devices according to a first to a fourth embodiment.

1 Optical system with infrared laser light as the light source

2 Beam splitter

3 Reflecting mirror

4 Transparent substrate on which phase difference films are formed

5 Lens holder

6 Objective lens 7, 9 Optical disk substrate 7a, 9a Signal surface

8 Optical system with red laser light as the light source

DESCRIPTION OF THE PREFERRED EMBODIMENTS (First Embodiment)

A first embodiment of the present invention will be described with reference to FIGS. 1 to 4. Elements common to those of the conventional example are designated by the same reference numerals. While the conventional example aims at reducing aberration of the infrared light source within an NA of 0.45, in the description given below, aberration reduction under a stricter condition, within an NA of 0.50 is aimed at. Although there are differences such that the number of phase steps is larger and the aberration characteristic is poorer than those of the conventional example, these are not essential.

FIG. 1 shows the cross-sectional structure of an optical disk device according to the first embodiment. In FIG. 1, a light ray from the optical system 8 with red laser light (wavelength $\lambda' =$ approximately 660 nm) as the light source passes through the beam splitter 2, is reflected at the reflecting mirror 3, passes through a transparent substrate 4 and an objective lens 6 fixed to a lens holder 5, is condensed by the objective lens 6, and converges on the signal surface 7a of the optical disk substrate 7 with a thickness of approximately 0.6 mm. On the other hand, a light ray from the optical system 1 with infrared laser light (wavelength λ=approximately 790 nm) as the light source is reflected at the beam splitter 2, is reflected at the reflecting mirror 3, passes through the transparent substrate 4 and the objective lens 6 fixed to the lens holder 5, is condensed by the objective lens 6, and converges on the signal surface 9a of the optical disk substrate 9 with a thickness of approximately 1.2 mm.

Examples of the optical disk substrate 7 with a thickness of approximately 0.6 mm include DVD-ROMs, DVD-RAMs, DVD-Rs, DVD-RWs and DVD+RWs. Examples of the optical disk substrate 9 with a thickness of approximately 1.2 mm include CD-ROMs, CD-R and CD-RWs.

Figure 2:
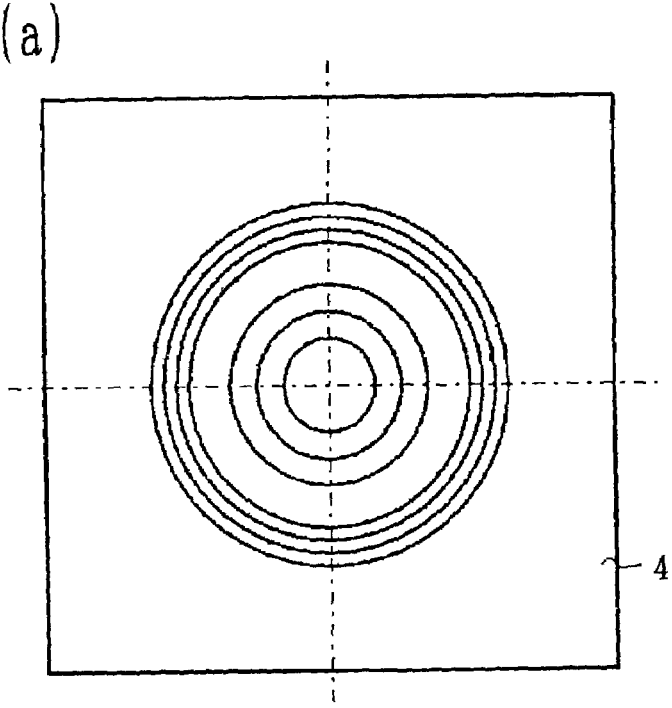
FIG. 2(a) is a plan view of a transparent substrate 4 of the optical disk device according to the first embodiment of the present invention.
FIG. 2(b) shows the cross-sectional structure of an objective lens 6 and the transparent substrate 4.
Figure 2:
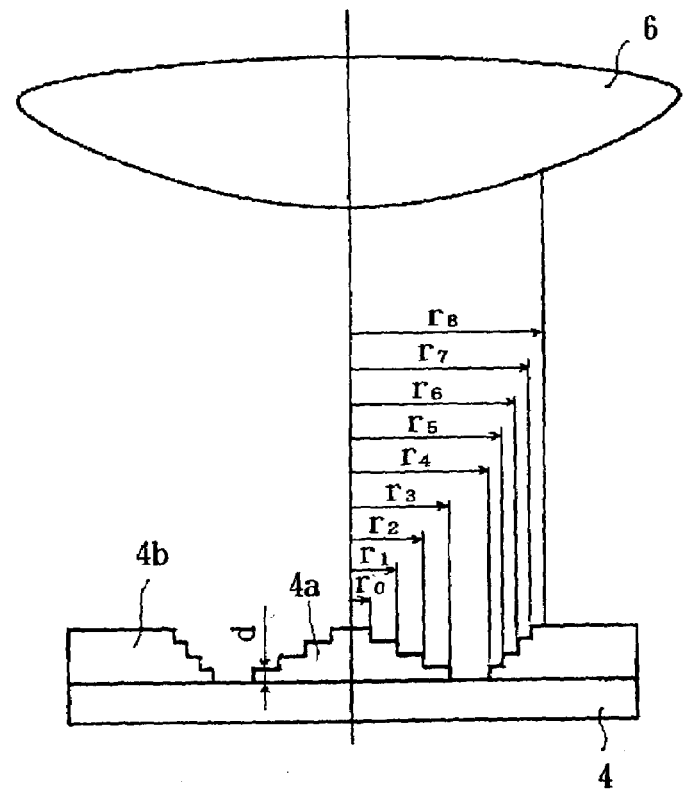

FIG. 2(*a*) is a plan view of the transparent substrate 4. FIG. 2(*b*) shows the cross-sectional structure of the objective lens 6 and the transparent substrate 4. On the transparent substrate 4, the phase difference films 4a and 4b are formed, and by these films, a step with a depth d is formed in each of the positions of radii r0, r1, r2, r3, r4, r5, r6 and r7. The objective lens 6 has its area inside the radius r8 optimized for optical disk substrates with a thickness of 0.85 mm and has its area outside the radius r8 optimized for optical disk substrates with a thickness of 0.60 mm.

Figure 3:
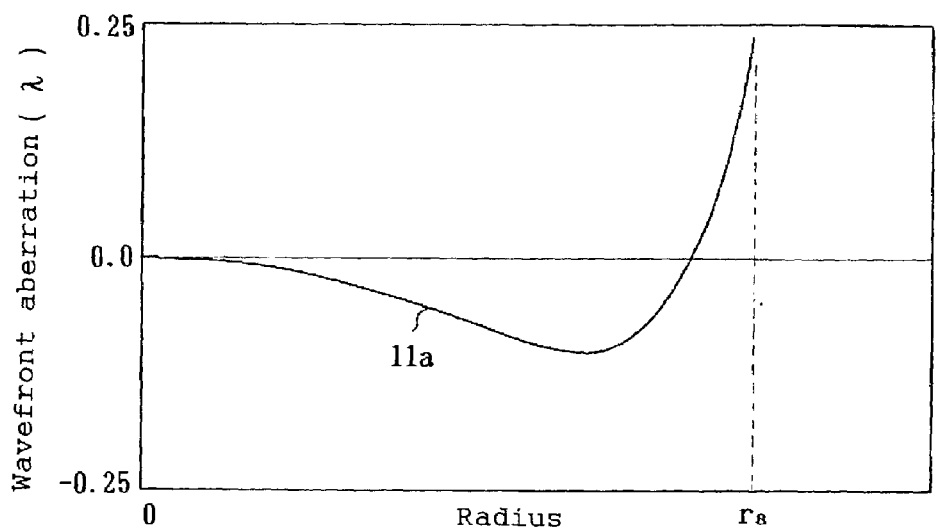
FIG. 3(a) shows the wavefront aberration characteristic of infrared laser light when it passes through an optical disk substrate 9 with a thickness of 1.2 mm in the optical disk device according to the first embodiment of the present invention (when the transparent substrate 4 is absent)
FIG. 3(b) shows the wavefront aberration characteristic of the infrared laser light when it passes through the optical disk substrate 9 with a thickness of 1.2 mm in the optical disk device according to the first embodiment of the present invention (when the transparent substrate 4 is present)
Figure 3:
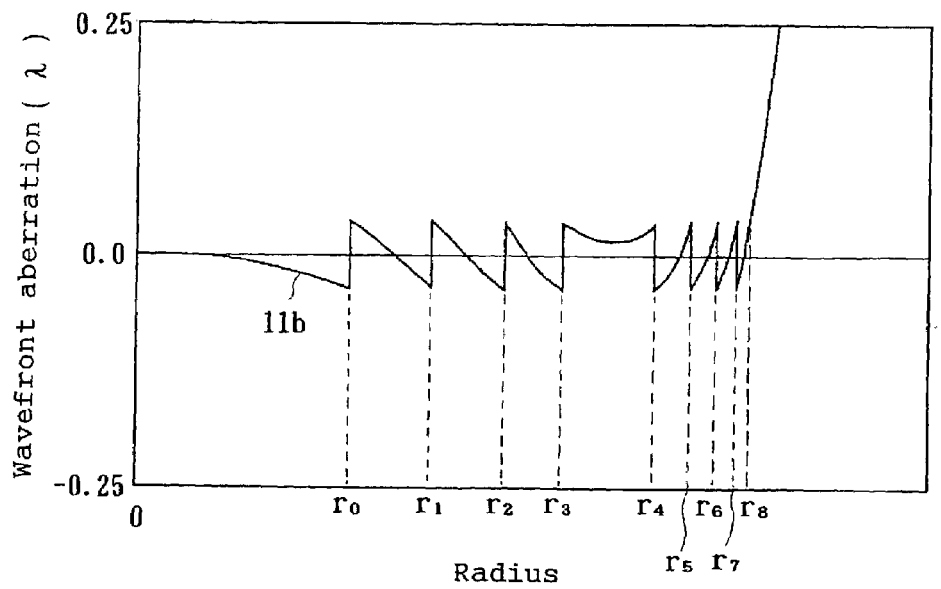

FIGS. 3(*a*) and 3(*b*) show the wavefront aberration characteristics of the infrared laser light when it passes through the optical disk substrate 9 with a thickness of 1.2 mm. The curve 11a of FIG. 3(*a*) and the curve 11b of FIG. 3(*b*) plot the wavefront aberrations in the radius positions when the transparent substrate 4 is absent and when the transparent substrate 4 is present, respectively. Since the objective lens 6 is optimized for optical disk substrates with a thickness of 0.85 mm, spherical aberration is caused in the case of the optical disk substrate 9 with a thickness of 1.2 mm. However, it is approximately half the level shown in the conventional example (see FIG. 11(*a*)).

Figure 4:
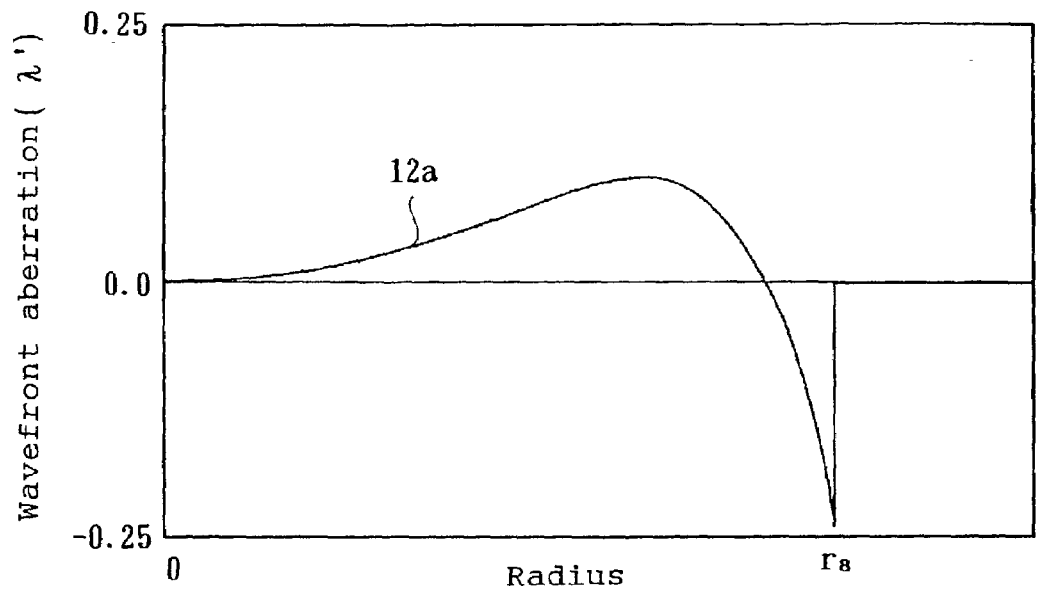
FIG. 4(a) shows the wavefront aberration characteristic of red laser light when it passes through an optical disk substrate 7 with a thickness of 0.6 mm in the optical disk device according to the first embodiment of the present invention (when the transparent substrate 4 is absent)
FIG. 4(b) shows the wavefront aberration characteristic of the red laser light when it passes through the optical disk substrate 7 with a thickness of 0.6 mm in the optical disk device according to the first embodiment of the present invention (when the transparent substrate 4 is present)
Figure 4:
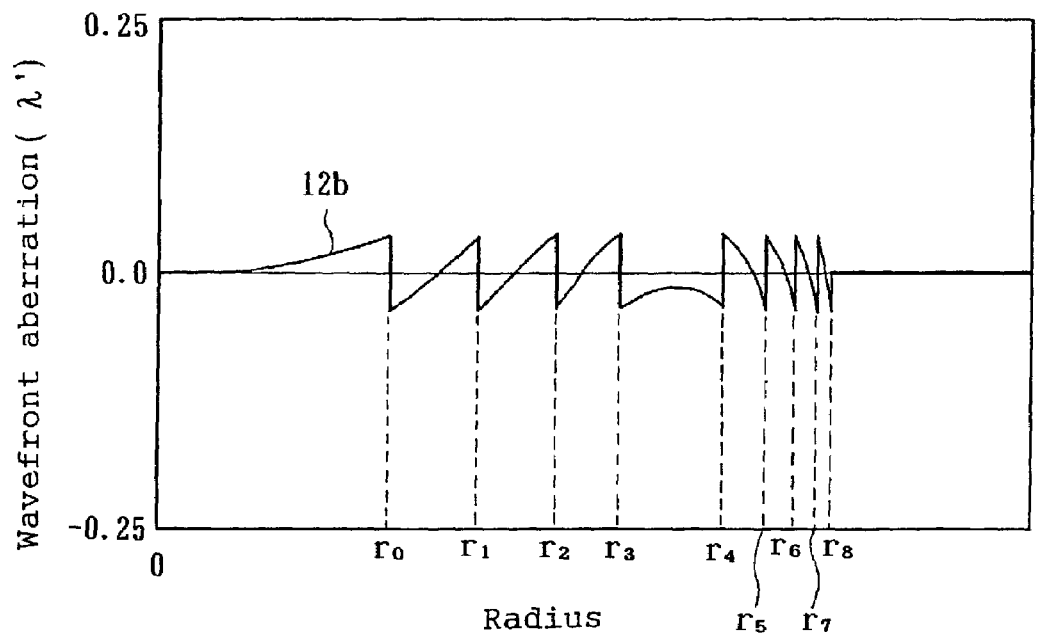

FIGS. 4(*a*) and 4(*b*) show the wavefront aberration characteristics of the red laser light when it passes through the optical disk substrate 7 with a thickness of 0.6 mm. The curve 12a of FIG. 4(*a*) and the curve 12b of FIG. 4(*b*) plot the wavefront aberrations in the radius positions when the transparent substrate 4 is absent and when the transparent substrate 4 is present, respectively. Since the objective lens 6 has its area inside the radius r8 optimized for optical disk substrates with a thickness of 0.85 mm, spherical aberration is caused in the case of the optical disk substrate 7 with a thickness of 0.6 mm, and its characteristic curve 12a substantially corresponds to a reversal of the curve 11a of FIG. 3(*a*). On the other hand, since the objective lens 6 has its area outside the radius r8 optimized for optical disk substrates with a thickness of 0.60 mm, the curve 12a is zero in the area outside the radius r8.

When the wavelength of the infrared laser light is λ, the wavelength of the red laser light is λ', the refractive index of the phase difference films 4a and 4b to the infrared light source is n and the refractive index to the red light source is n', the depth d is given by the following expression:

$$d=(m+m')/\{(n-1)/\lambda+(n'-1)/\lambda'\} \quad \text{(Expression 2)}$$

Here, m and m' are integers not less than 1.

Since generally n≠n', the following expression holds:

$$d=(m+m')/(n-1)\times\lambda\lambda'/(\lambda+\lambda') \quad \text{(Expression 3)}$$

Therefore, the phase difference between the projections and depressions caused by the laser light passing through the phase difference films 4a and 4b corresponds to (n−1)d=(m+m') ×λλ'/(λ+λ'). Therefore, when λ'=660 nm and λ=790 nm, the phase difference δ' caused by the red laser light passing through the steps with the depth d is, by subtracting an integral multiple of λ', 0.0897 λ', and the phase difference δ caused by the infrared laser light passing through the steps with the depth d is, by subtracting an integral multiple of λ, −0.0897 λ. Thus, the phase differences caused by the red light and the infrared light are the same in absolute value and opposite in polarity.

Therefore, in the case of the infrared light, as shown by the curve 11b, from the phase in the area between the radii 0 and r0, the phase is advanced relatively by 0.0897 λ in the zonal areas between the radii r0 and r1 and between the radii r6 and r7, the phase is advanced relatively by 0.1794 λ in the zonal areas between the radii r1 and r2 and between the radii r5 and r6, the phase is advanced relatively by 0.2691 λ in the zonal areas between the radii r2 and r3 and between the radii r4 and r5, and the phase is advanced relatively by 0.3588 λ in the zonal area between the radii r3 and r4. The curve 11b is lower in the RMS value of the wavefront aberration in the area between the radii 0 and r8 than the curve 11a, and the wavefront aberration is small because of the presence of the phase difference films 4a and 4b. For example, under a condition where r0/f=0.091, r1/f=0.162, 2/f=0.221, r3/f=0.277, r4/f=0.428, r5/f=0.456, r6/f=0.474, r7/f=0.486 and r8/f=0.50 in evaluation within an NA of 0.50, wavefront aberration can be reduced to 28 mλ. The remaining aberration is mostly higher-order aberration, and third- and lower-order aberration is substantially zero.

On the other hand, in the case of the red light, as shown by the curve 12b, from the phase in the area between the radii 0 and r0, the phase is delayed relatively by 0.0897 λ in the zonal areas between the radii r0 and r1 and between the radii r6 and r7, the phase is delayed relatively by 0.1794 λ in the zonal areas between the radii r1 and r2 and between the radii r5 and r6, the phase is delayed relatively by 0.2691 λ in the zonal areas between the radii r2 and r3 and between the radii r4 and r5, and the phase is delayed relatively by 0.3588 λ in the zonal area between the radii r3 and r4. The phase in the area outside the radius r8 is zero. The curve 12b is smaller in wavefront aberration in the entire aperture area than the curve 12a, and aberration is small because of the presence of the phase difference films 4a and 4b. For example, under a condition where r0/f=0.091, r1/f=0.162, r2/f=0.221, r3/f=0.277, r4/f=0.428, r5/f=0.456, r6/f=0.474, r7/f=0.486 and r8/f=0.50 in evaluation within an NA of 0.60, wavefront aberration can be reduced to 28 mλ. The remaining aberration is mostly higher-order aberration, and third- and lower-order aberration is substantially zero.

Since higher-order aberration does not affect the spot size although decreasing the light quantity of the main spot at the light condensation point, the recording and reproduction performance of the optical disk device is hardly affected. Further, the higher-order aberration which is compressed to 42 mλ in the conventional example is compressed to 28 mλ and the equivalent light use efficiency loss of 7% can be compressed to 3% (the amount of generation of higher-order aberration increases as the NA increases, and since the result in the conventional example is one when NA=0.45 and the result in the present embodiment is one when NA=0.50, the aberration compression effect is higher when the NA condition is the same) Further, since the amount of spherical aberration before the phase correction is approximately half the level shown in the conventional example (see FIG.

11(a)), the generation of aberration due to the decentering of the phase difference films 4a and 4b and the objective lens 6 is significantly reduced, and the amount of generation of coma aberration due to the decentering of 50 μm is suppressed from 50 mλ which is in the conventional example to 30 mλ (the amount of generation of coma aberration increases as the NA increases, and since 50 mλ in the conventional example is a result when NA=0.45 and 30 mλ in the present embodiment is a result when NA=0.50, the aberration improvement effect is higher when the NA condition is the same).

While the aperture is limited for only the infrared laser light by using the interference filter film 21c in the conventional example, the aperture may be limited for only one of the light rays by using an interference filter film, a grating or the like also in the present embodiment. Moreover, while in the present embodiment, the absolute values of the phase differences caused by the red light and the infrared light in the area inside the radius r8 are made the same by using the step depth d satisfying the expression 2, the absolute values may be different as long as the phase differences are opposite in polarity. In this case, a specification (matching disk substrate thickness) of the objective lens is different accordingly. For example, when (the absolute value of the phase difference caused by the red light)>(the absolute value of the phase difference caused by the infrared light), the matching disk substrate thickness in the area inside the radius r8 is a value between 0.85 mm and 1.2 mm, and when (the absolute value of the phase difference caused by the red light)<(the absolute value of the phase difference caused by the infrared light), the matching disk substrate thickness in the area inside the radius r8 is a value between 0.85 mm and 0.60 mm.

Moreover, the radius r8 maybe the aperture of the objective lens 6. In this case, the objective lens 6 has its entire area optimized for optical disk substrates with a thickness of 0.85 mm (or a specific thickness between 0.6 mm and 1.2 mm). Further, while the radius r8 is set outside the outermost step position (r7), it may be inside the outermost step position. Moreover, while the step configuration when viewed along the central axis of the objective lens 6 is along a circle when the normal to the transparent substrate 4 is parallel to the central axis, the step configuration is along an ellipse when the normal is not parallel to the central axis. Moreover, while the step structure is formed on the transparent substrate 4, it may be formed on the surface of the objective lens 6. In this case, the transparent substrate 4 is unnecessary. Further, these are common to the present embodiment and the embodiments described below.

(Second Embodiment)

A second embodiment of the present invention will be described with reference to FIGS. 1 and 5 to 8. FIG. 1 shows the cross-sectional structure of an optical disk device according to the second embodiment. Since the structure is completely the same as that of the first embodiment except that the cross-sectional structure of the objective lens 6 and the transparent substrate 4 is different, description thereof is omitted.

Figure 5:
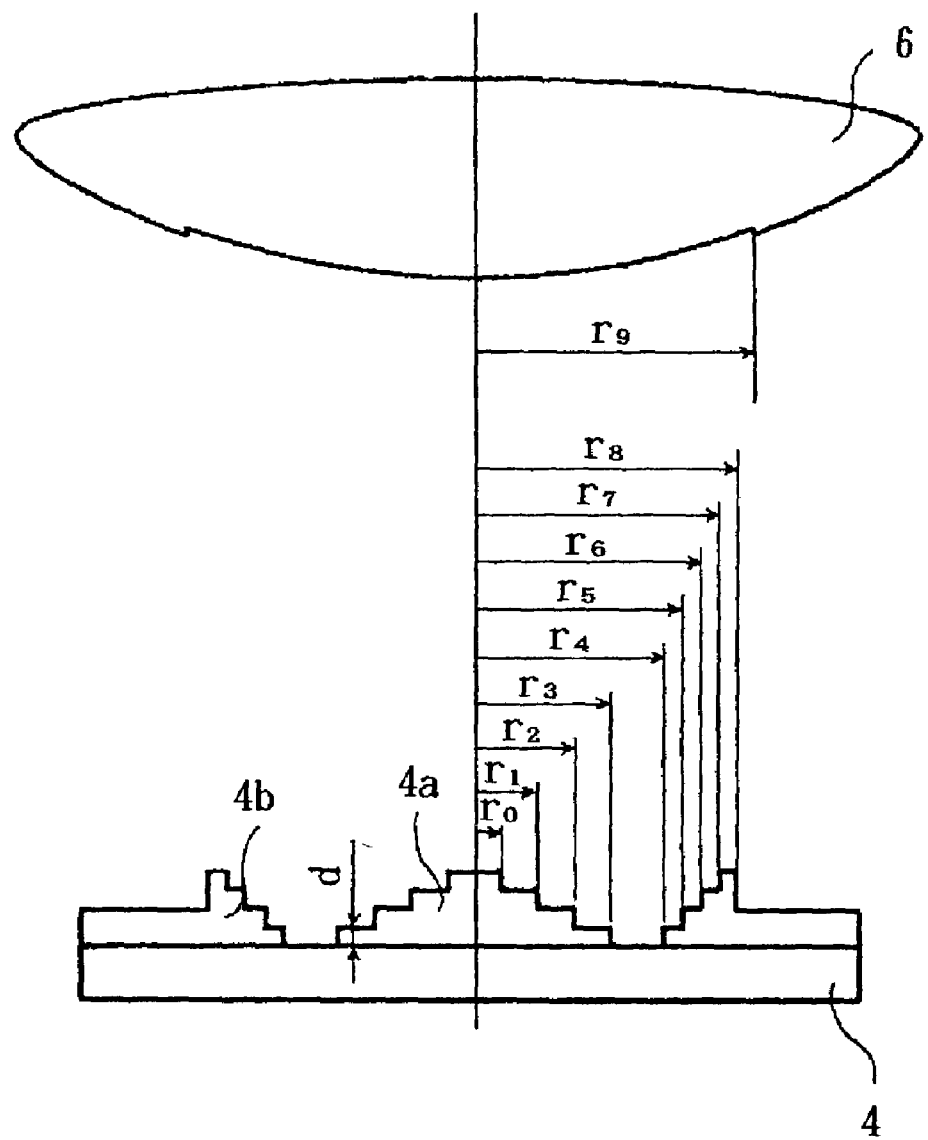
FIG. 5 shows the cross-sectional structure of the objective lens 6 and the transparent substrate 4 of the optical disk device according to the second embodiment of the present invention.
Figure 6:
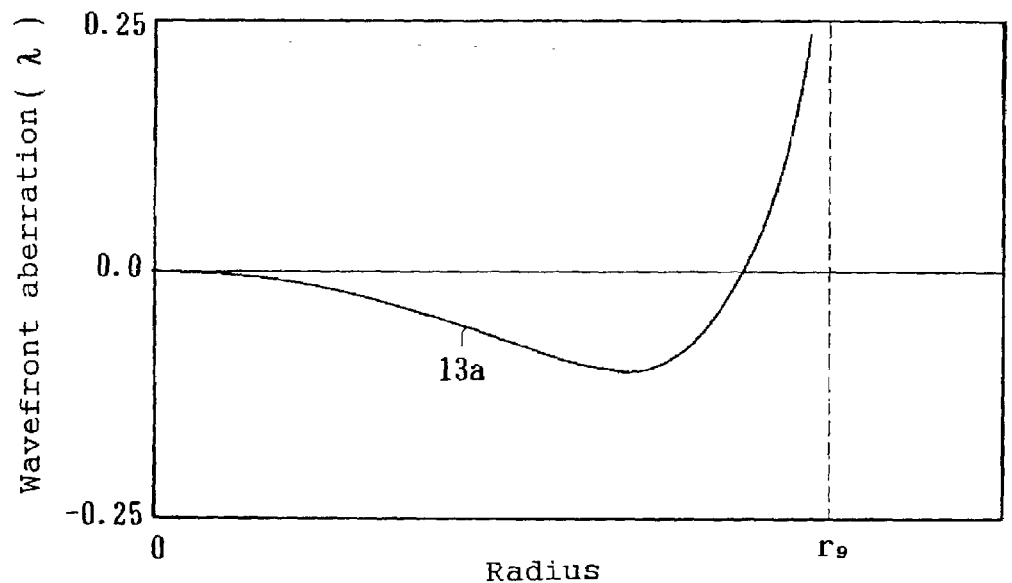
FIG. 6(a) shows the wavefront aberration characteristic of the infrared laser light when it passes through the optical disk substrate 9 with a thickness of 1.2 mm in the optical disk device according to the second embodiment of the present invention (when the transparent substrate 4 is absent)
FIG. 6(b) shows the wavefront aberration characteristic of the infrared laser light when it passes through the optical disk substrate 9 with a thickness of 1.2 mm in the optical disk device according to the second embodiment of the present invention (when the transparent substrate 4 is present)
Figure 6:
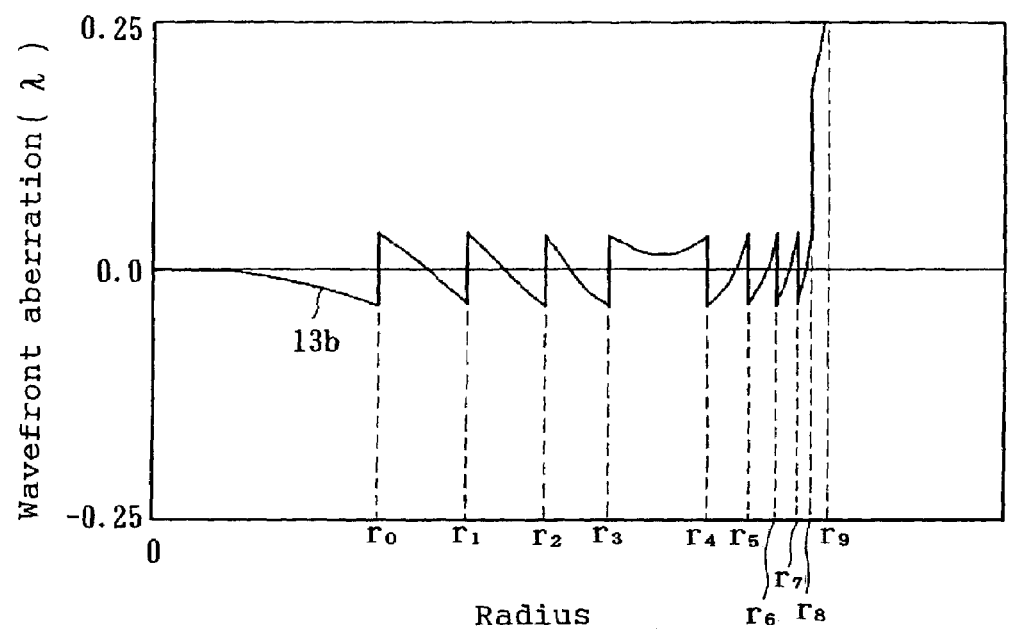
Figure 7:
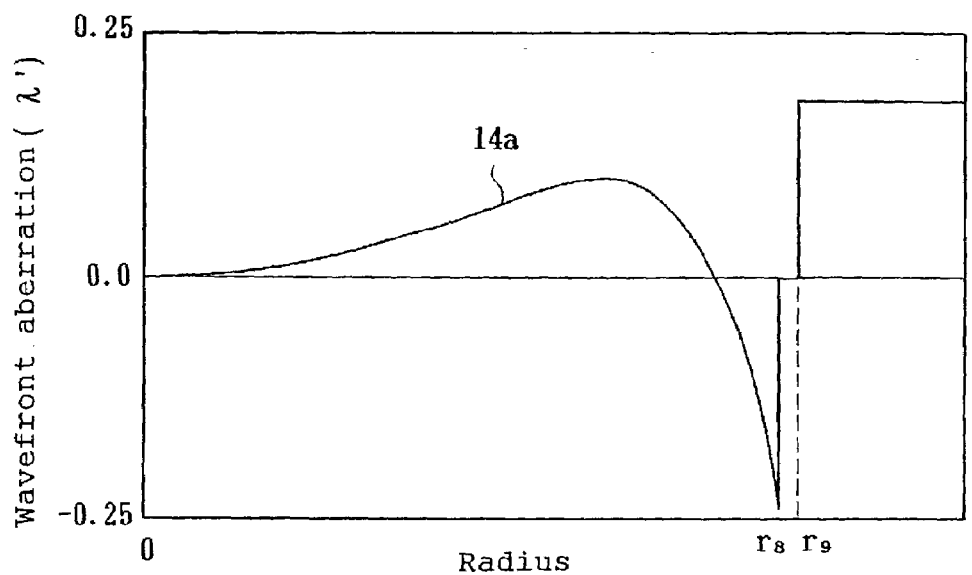
FIG. 7(a) shows the wavefront aberration characteristic of the red laser light when it passes through the optical disk substrate 7 with a thickness of 0.6 mm in the optical disk device according to the second embodiment of the present invention (when the transparent substrate 4 is absent)
FIG. 7(b) shows the wavefront aberration characteristic of the red laser light when it passes through the optical disk substrate 7 with a thickness of 0.6 mm in the optical disk device according to the second embodiment of the present invention (when the transparent substrate 4 is present)
Figure 7:
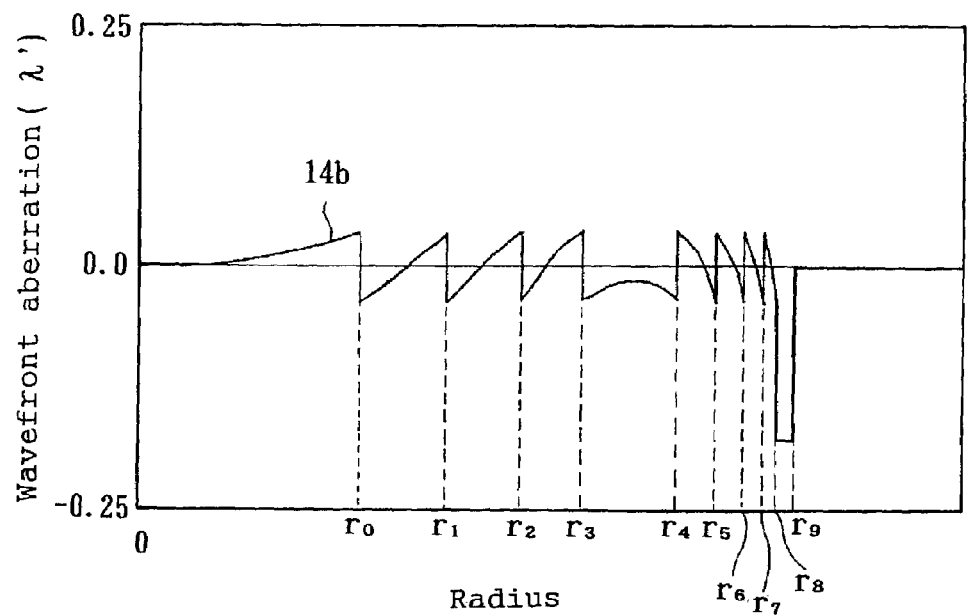

FIG. 5 shows the cross-sectional structure of the objective lens 6 and the transparent substrate 4 in the second embodiment. On the transparent substrate 4, the phase difference films 4a and 4b are formed. By these films, a step with a depth d is formed in each of the positions of radii r0, r1, r2, r3, r4, r5, r6 and r7, and a step with a depth 2d is formed in the position of a radius r8. The value of d is given by the expression (2) shown in the first embodiment. The objective lens 6 has its area inside the radius r8 optimized for optical disk substrates with a thickness of 0.85 mm and has its area outside the radius r8 optimized for optical disk substrates with a thickness of 0.60 mm, and a step for correcting the phase on the outer side to the level in the position of the radius 0 is present in the position of a radius r9. This step may be formed on the opposite surface (the surface on the side of the disk substrate).

FIGS. 6(a) and 6(b) show the wavefront aberration characteristics of the infrared laser light when it passes through the optical disk substrate 9 with a thickness of 1.2 mm. The curve 13a of FIG. 6(a) and the curve 13b of FIG. 6(b) plot the wavefront aberrations in the radius positions when the transparent substrate 4 is absent and when the transparent substrate 4 is present, respectively. Since the objective lens 6 has its area inside the radius r8 optimized for optical disk substrates with a thickness of 0.85 mm, spherical aberration is caused in the case of the optical disk substrate 9 with a thickness of 1.2 mm. However, it is approximately half the level shown in the conventional example (see FIG. 11(a)).

Moreover, by the effect of the steps on the transparent substrate 4, as shown by the curve 13b, from the phase in the area between the radii 0 and r0, the phase is advanced relatively by 0.0897 λ in the zonal areas between the radii r0 and r1 and between the radii r6 and r7, the phase is advanced relatively by 0.1794 λ in the zonal areas between the radii r1 and r2 and between the radii r5 and r6, the phase is advanced relatively by 0.2691 λ in the zonal areas between the radii r2 and r3 and between the radii r4 and r5, the phase is advanced relatively by 0.3588 λ in the zonal area between the radii r3 and r4, and the phase is advanced relatively by 0.1794 λ in the zonal area between the radii r8 and r9. The curve 13b is lower in the RMS value of the wavefront aberration in the area between the radii 0 and r8 than the curve 13a, and the wavefront aberration is small because of the presence of the phase difference films 4a and 4b.

For example, under a condition where r0/f=0.091, r1/f=0.162, r2/f=0.221, r3/f=0.277, r4/f=0.428, r5/f=0.456, r6/f=0.474, r7/f=0.486 and r8/f=0.50 in evaluation within an NA of 0.50, wavefront aberration can be reduced to 28 mλ. The remaining aberration is mostly higher-order aberration, and third- and lower-order aberration is substantially zero. Even if the centers of the objective lens 6 and the transparent substrate 4 shift, the phase in the area between the radii r8 and r9 acts in a direction that cancels the aberration caused by the decentering, and by setting r9/f to (r8+0.05)/f, the generation of coma aberration due to a decentering of 50 λm can be compressed to 15 mλ which is smaller than 30 mλ in the first embodiment.

FIGS. 7(a) and 7(b) show the wavefront aberration characteristics of the red laser light when it passes through the optical disk substrate 7 with a thickness of 0.6 mm. The curve 14a of FIG. 7(a) and the curve 14b of FIG. 7(b) plot the wavefront aberrations in the radius positions when the transparent substrate 4 is absent and when the transparent substrate 4 is present, respectively. Since the objective lens 6 has its area inside the radius r8 optimized for optical disk substrates with a thickness of 0.85 mm, spherical aberration is caused in the case of the optical disk substrate 7 with a thickness of 0.6 mm, and its characteristic curve 14a substantially corresponds to a reversal of the curve 13a of FIG. 6(a). On the other hand, since the objective lens 6 has its area outside the radius r8 optimized for optical disk substrates with a thickness of 0.60 mm, the curve 14a is zero in the area between the radii r8 and r9, and a phase of the amount corrected by the step on the lens side is present in the area outside the radius r9.

Moreover, by the effect of the steps on the transparent substrate 4, as shown by the curve 14b, from the phase in the area between the radii 0 and r0, the phase is delayed relatively by 0.0897 λ in the zonal areas between the radii r0 and r1 and between the radii r6 and r7, the phase is delayed relatively by 0.1794 λ in the zonal areas between the radii r1 and r2 and between the radii r5 and r6, the phase is delayed relatively by 0.2691 λ in the zonal areas between the radii r2 and r3 and between the radii r4 and r5, the phase is delayed relatively by 0.3588 λ in the zonal area between the radii r3 and r4, and the phase is delayed relatively by 0.1794 λ in the zonal area between the radii r8 to r9. The phase in the area outside the radius r9 is corrected to zero. The curve 14b is smaller in wavefront aberration in the entire aperture area than the curve 14a, and aberration is small because of the presence of the phase difference films 4a and 4b and the step on the objective lens 6.

For example, under a condition where r0/f=0.091, r1/f=0.162, r2/f=0.221, r3/f=0.277, r4/f=0.428, r5/f=0.456, r6/f=0.474, r7/f=0.486, r8/f=0.50 and r9/f=(r8+0.05)/f in evaluation within an NA of 0.60, wavefront aberration can be reduced to 28 mλ. The remaining aberration is mostly higher-order aberration, and third- and lower-order aberration is substantially zero. Even if the centers of the objective lens 6 and the transparent substrate 4 shift, its influence is small. The aberration caused by a decentering of 50 μm is approximately 20 mλ. The aberration is mostly higher-order aberration (fifth-order coma aberration), and third- and lower-order aberration remains substantially zero. In the second embodiment, taking possible decentering of the objective lens 6 and the transparent substrate 4 into consideration, the phase correction area is increased. The number of steps in the position of the radius r8 may be other than two, and an optimum solution is present in addition to an integral multiple of d. Thus, according to the second embodiment, an advantage that the generation of coma aberration due to the decentering of the objective lens 6 and the transparent substrate 4 can be significantly reduced is obtained in addition to the effects similar to those of the first embodiment.

(Third Embodiment and Fourth Embodiment)

A third embodiment and a fourth embodiment of the present invention will be described with reference to FIGS. 1, 8 and 9. FIG. 1 shows the cross-sectional structure of optical disk devices of the third and the fourth embodiments. Since the structure is completely the same as that of the first embodiment except that the positional relationship between the light sources and the cross-sectional structure of the objective lens 6 and the transparent substrate 4 are different, description thereof is omitted.

Figure 8:
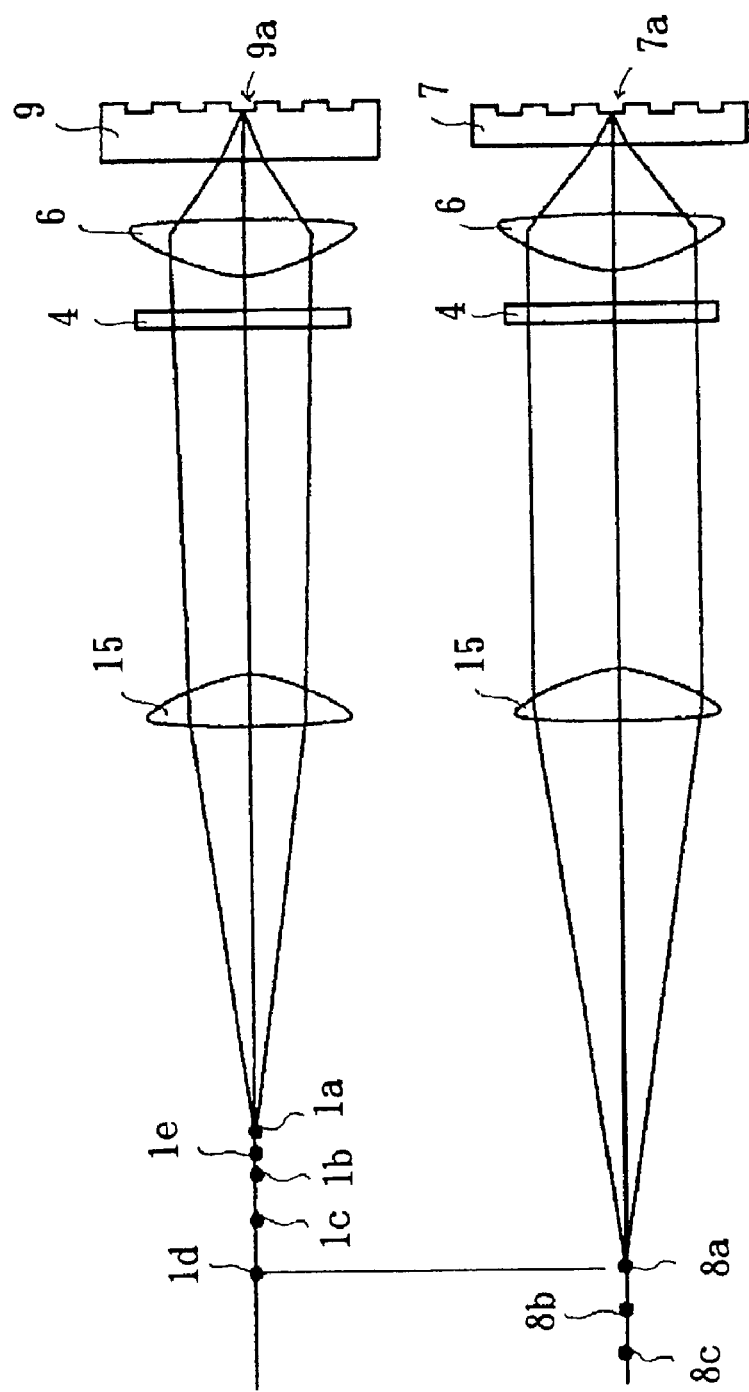
FIG. 8 separately shows the optical structures of the light sources of the optical disk devices according to the third and the fourth embodiments.

FIG. 8 separately shows the optical structures of the light sources for ease of understanding of the principle of the third and the fourth embodiments. In FIG. 8, as a case where the transparent substrate 4 is absent and the objective lens 6 is optimized for optical disk substrates with a thickness of 0.60 mm, 8a is the light emission point of the red laser light for the light to converge with no aberration on the signal surface 7a of the optical disk substrate 7 with a thickness of 0.6 mm, and 1a is the light emission point of the infrared laser light for the light to converge with no aberration on the signal surface 9a of the optical disk substrate 9 with a thickness of 1.2 mm (hereinafter, referred to as reference condition). The light rays emanating from the point 8a and a point 1d in the figure are collimated by a collimator lens.

Figure 9:
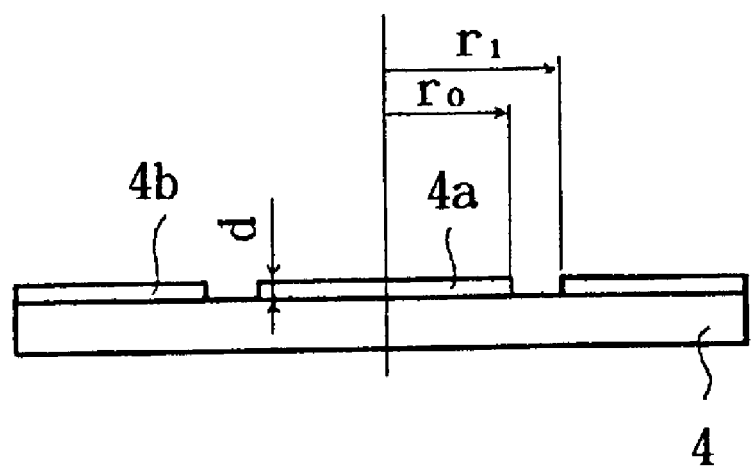
FIG. 9 shows the cross-sectional structure of the transparent substrate 4 of the optical disk device according to the third embodiment.
Figure 10:
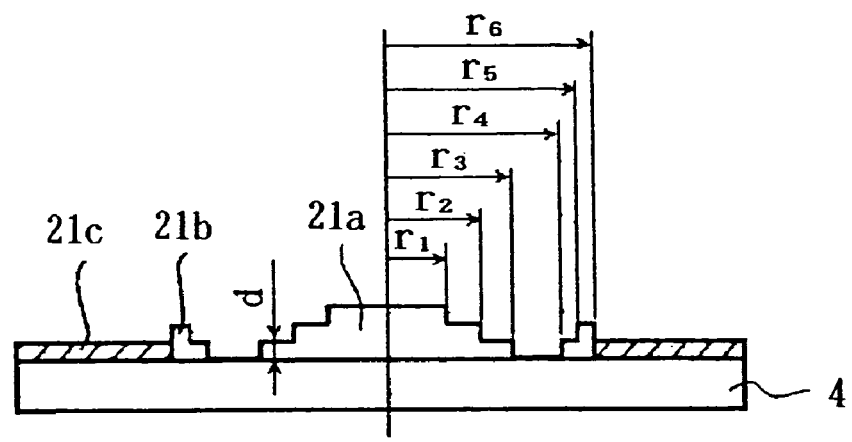
FIG. 10 shows the cross-sectional structure of the transparent substrate 21 in the conventional example.
Figure 12:
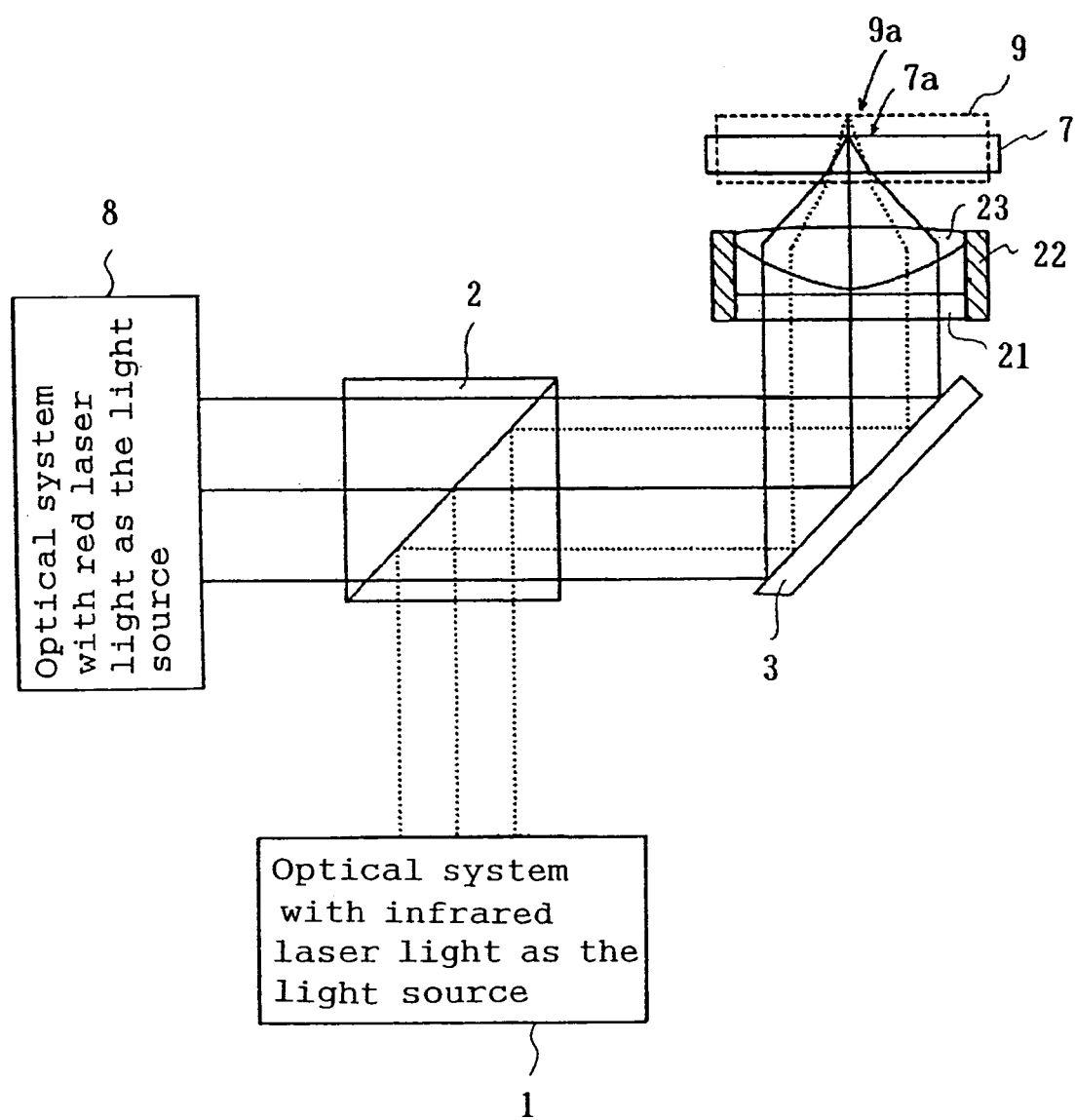
FIG. 12 shows the cross-sectional structure of the optical disk device according to the conventional example.

In the third embodiment, the objective lens 6 is optimized for optical disk substrates with a thickness of 0.6+α mm (here, α<0.25 mm), and the number of steps of the phase difference films on the transparent substrate 4 is smaller than that shown in FIG. 2, for example, one as shown in FIG. 9. The light emission point is situated at the point 8a on the red side, and at a point 1c on the infrared side. The step depth d of the transparent substrate 4 is the same as that of the expression 3. Therefore, the phase differences caused by the red light and the infrared light are the same in absolute value and opposite in polarity. Therefore, when the transparent substrate 4 is removed, the light emission point of the red laser light for the light to converge with no aberration on the signal surface 7a of the optical disk substrate 7 with a thickness of 0.6 mm is situated at a point 8b, and the light emission point of the infrared laser light for the light to converge with no aberration on the signal surface 9a of the optical disk substrate 9 with a thickness of 1.2 mm is situated at a point 1b. When the transparent substrate 4 is inserted, the light emission points for non-aberration convergence shift from 8b to 8a and from 1b to 1c.

The reason why the shift directions are opposite is that the phase differences caused by the red light and the infrared light are opposite in polarity. Since the point 1c is closer to the point 1d than the point 1a, the light ray incident on the objective lens 6 is close to a parallel ray. Therefore, compared to the reference condition, the aberration caused when the objective lens 6 shifts in response to tracking control is suppressed to be small. The reason why the number of steps is smaller than that shown in FIG. 2 of the first embodiment is that since α<0.25 mm, the aberration caused due to a mismatch of the disk substrate thickness is smaller than that in the first embodiment. Therefore, the third embodiment has an advantage that the phase difference layers are easier to form than those of the first embodiment. The first embodiment corresponds to a case where α=0.25 mm in the third embodiment. In this case, the step configuration is the same as that of FIG. 2, and the light emission point 1c coincides with the point 1d. It is to be noted that a structure such that the matching substrate thickness of the objective lens 6 is varied among the areas like in the first embodiment is considered.

In the fourth embodiment, the objective lens 6 is optimized for optical disk substrates with a thickness of 0.85 mm, and the phase difference films on the transparent substrate 4 are the same as those shown in FIG. 2. The light emission point is situated at the point 8a on the red side, and at a point 1e on the infrared side. The phase step depth d of the transparent substrate 4 satisfies the following expression:

$$d<\lambda/(n-1) \text{ and } d<\lambda'/(n-1) \quad \text{(expression 4)}$$

The expression 4 is a relationship where the phase differences caused by the red light and the infrared light are different in absolute value (proportional to the inverse of the wavelength) and the same in polarity (the relationship may be other than the expression 4 as long as the phase differences are different in absolute value and the same in polarity). Therefore, when the transparent substrate 4 is removed, the light emission point of the red laser light for the light to converge with no aberration on the signal surface 7a of the optical disk substrate 7 with a thickness of 0.6 mm is situated at a point 8c, and the light emission point of the infrared laser light for the light to converge with no aberration on the signal surface 9a of the optical disk substrate 9 with a thickness of 1.2 mm is situated at the point 1c. When the transparent substrate 4 is inserted, the light emission points for non-aberration convergence shift from 8c to 8a and from 1c to 1e.

The reason why the shift directions are the same is that the phase differences caused by the red light and the infrared light are the same in polarity, and the shift width which is proportional to the absolute value of the phase difference is larger in the case of the red light than in the case of the infrared light. Therefore, a relationship (the distance between 8c and 8a)>(the distance between 1c and 1e) holds, and since the point 1e is closer to the point 1d than the point 1a, the light ray incident on the objective lens 6 is close to a parallel ray. Therefore, compared to the reference condition, the aberration caused when the objective lens 6 shifts in response to tracking control is suppressed to be small like in the third embodiment. It is to be noted that a structure such that the matching substrate thickness of the objective lens 6 is varied among the areas like in the first embodiment is considered, and the matching substrate thickness may be a specific thickness between 0.6 mm and 12 mm other than 0.85 mm or may be a thickness other than that (not more than 0.6 mm or not less than 1.2 mm) from the characteristic that the phase differences are the same in polarity.

While the first to the fourth embodiments have been described, they are different from the conventional example in that the step structure that senses a phase difference for two wavelengths is combined with an objective lens designed for a substrate thickness other than the standard thicknesses (for example, 1.2 mm of CDs and 0.6 mm of DVDs). Therefore, the relationship between the red light source and the infrared light source may be replaced, and the light source wavelengths may be a combination of other than red and infrared (for example, blue and red, blue and infrared, or infrared and blue). The disk substrate thickness may be a combination of other than 0.6 mm and 1.2 mm. Moreover, the use of three light sources is considered, and the step structure may be one that senses a phase difference for the three wavelengths.

While two kinds of optical systems, the optical system 8 for red and the optical system 1 for infrared are used in the embodiments, the present invention is not limited thereto. An optical system for blue may be used in addition to the optical system for red and the optical system for infrared. In this case, as the transparent substrate 4, the lens holder 5 and the objective lens 6 of FIG. 1, a transparent substrate, a lens holder and an objective lens for two colors of blue and red are provided in addition to the ones for the two colors of red and infrared described in the first and the second embodiments. When a blue light source is used, the transparent substrate, the lens holder and the objective lens are switched to the ones for the two colors of blue and red.

Or a transparent substrate, a lens holder and an objective lens for two colors of blue and infrared are provided in addition to the ones for the two colors of red and infrared described in the first and the second embodiments, and when a blue light source is used, the transparent substrate, the lens holder and the objective lens are switched to the ones for the two colors of blue and infrared.

Likewise, when an optical system for three or more colors is used, a plurality of transparent substrates, lens holders and objective lenses for two different colors is provided in addition to the ones for the two colors of red and infrared described in the first and the second embodiments, and when a light source of a specific color is used, the transparent substrate, the lens holder and the objective lens are switched to the one for the specific color.

According to the embodiments, by the phases of the two light rays being corrected by the step structure on the surface of the transparent substrate, the aberration caused in the case of an optical disk with a substrate thickness different among light sources can be suppressed to be small although a common objective lens is used. Particularly, since the distortion of the wavefront concentrating on one light ray can be distributed to two light rays, the generation of higher-order aberration due to the phase correction and the generation of aberration due to the decentering of the transparent substrate and the objective lens can be significantly reduced. Further, since the light ray incident on the objective lens is a parallel ray or a light ray close to a parallel ray, the aberration caused by the decentering of the objective lens can be significantly reduced.

As is apparent from the description given above, according to the present invention, excellent signal recording and reproduction are realized for optical disks with different substrate thicknesses by significantly reducing the aberration and the higher-order aberration caused by the decentering of the transparent substrate and the objective lens.

What is claimed is:

1. An optical disk device comprising:
   a first emission light source;
   a second emission light source;
   a transparent substrate; and
   an objective lens,
   wherein a first light ray with a wavelength $\lambda 1$ emanating from the first emission light source passes through the transparent substrate and is condensed by the objective lens on a signal surface of a first optical disk with a substrate thickness t1,
   wherein a second light ray with a wavelength $\lambda 2$ ($\neq \lambda 1$) emanating from the second emission light source passes through the transparent substrate and is condensed by the objective lens on a signal surface of a second optical disk with a substrate thickness t2,
   wherein a step structure of at least one step is formed along a circle or an ellipse on a surface of the transparent substrate,
   wherein a phase of the first light ray is shifted by $2\pi n1+\Delta 1$ (n1 is an integer, and $\Delta 1$ is not 0 but a value between $-\pi$ and $\pi$) by the step structure and a phase of the second light ray is shifted by $2\pi n2+\Delta 2$ (n2 is an integer, and $\Delta 2$ is not 0 but a value between $-\pi$ and $\pi$) by the step structure,
   wherein a light ray incident with a substantially parallel wavefront on at least an area of the objective lens is condensed with substantially no aberration on a signal surface of a third optical disk with a substrate thickness t3 (a value different from t1 and t2), and
   wherein the substrate thickness t3 is a value between t1 and t2 and a relationship $\Delta 1 \times \Delta 2 < 0$ holds between the phase differences $\Delta 1$ and $\Delta 2$.

2. An optical disk device according to claim 1,
   wherein a light ray incident with a substantially parallel wavefront on an area a of the objective lens is condensed with substantially no aberration on the signal surface of the third optical disk, the light ray having a radius r where $r \leq a$, and
   wherein a further light ray incident with a substantially parallel wavefront on the area of the objective lens is condensed with substantially no aberration on the signal surface of the first optical disk, the further light ray having a radius greater than the area.

3. An optical disk device according to claim 1,
   wherein a relationship $\Delta 1 = -\Delta 2$ approximately holds between the phase differences $\Delta 1$ and $\Delta 2$.

4. An optical disk device according to claim 1 or 2,
   wherein the wavelength $\lambda 1$ is about 0.66 µm; the substrate thickness t1 is about 0.6 mm; the wavelength $\lambda 2$ is about 0.79 µm; and the substrate thickness t2 is about 1.2 mm.

5. An optical disk device according to claim 3,
wherein the wavelength $\lambda 1$ is about 0.66 μm; the substrate thickness t1 is about 0.6 mm; the wavelength $\lambda 2$ is about 0.79 μm; the substrate thickness t2 is about 1.2 mm; and the substrate thickness t3 is about 0.85 mm.

6. An optical disk device comprising:
a first emission light source;
a second emission light source; and
an objective lens,
wherein a first light ray with a wavelength $\lambda 1$ emanating from the first emission light source is condensed by the objective lens on a signal surface of a first optical disk with a substrate thickness t1,
wherein a second light ray with a wavelength $\lambda 2$ ($\neq \lambda 1$) emanating from the second emission light source is condensed by the objective lens on a signal surface of a second optical disk with a substrate thickness t2,
wherein a step structure of at least one step is formed along a circle on a surface of the objective lens,
wherein a phase of the first light ray is shifted by $2\pi n1 + \Delta 1$ (n1 is an integer, and $\Delta 1$ is not 0 but a value between $-\pi$ and $\pi$) by the step structure and a phase of the second light ray is shifted by $2\pi n2 + \Delta 2$ (n2 is an integer, and $\Delta 2$ is not 0 but a value between $-\pi$ and $\pi$) by the step structure,
wherein a light ray incident with a substantially parallel wavefront on at least an area of the objective lens is condensed with substantially no aberration on a signal surface of a third optical disk with a substrate thickness t3 (a value different from t1 and t2) without being phase-shifted by the step structure, and
wherein the substrate thickness t3 is a value between t1 and t2.

7. An optical disk device according to claim 6,
wherein a light ray incident with a substantially parallel wavefront on an area a of the objective lens is condensed with substantially no aberration on the signal surface of the third optical disk, the light ray having a radius r where $r \leq a$, and a further light ray incident with a substantially parallel wavefront on the area of the objective lens is condensed with substantially no aberration on the signal surface of the first optical disk, the further light ray having a radius greater than the area.

8. An optical disk device according to claim 6,
wherein a relationship $\Delta 1 \times \Delta 2 < 0$ holds between the phase differences $\Delta 1$ and $\Delta 2$.

9. An optical disk device according to claim 8,
wherein a relationship $\Delta 1 = -\Delta 2$ approximately holds between the phase differences $\Delta 1$ and $\Delta 2$.

10. An optical disk device according to any one of claims 7, 8, 9, or 6,
wherein the wavelength $\lambda 1$ is about 0.66 μm; the substrate thickness t1 is about 0.6 mm; the wavelength $\lambda 2$ is about 0.79 μm; and the substrate thickness t2 is about 1.2 mm.

11. An optical disk device according to claim 9,
wherein the wavelength $\lambda 1$ is about 0.66 μm; the substrate thickness t1 is about 0.6 mm; the wavelength $\lambda 2$ is about 0.79 μm; the substrate thickness t2 is about 1.2 mm; and the substrate thickness t3 is about 0.85 mm.

* * * * *